US010832633B2

(12) United States Patent
Park et al.

(10) Patent No.: US 10,832,633 B2
(45) Date of Patent: Nov. 10, 2020

(54) SINK DEVICE AND POWER CONTROL METHOD THEREFOR

(71) Applicant: SAMSUNG ELECTRONICS CO., LTD., Suwon-si (KR)

(72) Inventors: Jong-jin Park, Suwon-si (KR); Je-hwan Seo, Daegu (KR); Seung-il Yoon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/322,386

(22) PCT Filed: Jun. 27, 2017

(86) PCT No.: PCT/KR2017/006794
§ 371 (c)(1),
(2) Date: Jan. 31, 2019

(87) PCT Pub. No.: WO2018/026104
PCT Pub. Date: Feb. 8, 2018

(65) Prior Publication Data
US 2019/0172413 A1 Jun. 6, 2019

(30) Foreign Application Priority Data
Aug. 3, 2016 (KR) .................. 10-2016-0098933

(51) Int. Cl.
*G09G 5/00* (2006.01)
*H04N 21/443* (2011.01)
(Continued)

(52) U.S. Cl.
CPC .............. *G09G 5/006* (2013.01); *G06F 1/12* (2013.01); *G06F 1/3215* (2013.01);
(Continued)

(58) Field of Classification Search
CPC .. G09G 5/006; G09G 5/008; G09G 2330/021; G09G 2370/04; G09G 2370/12;
(Continued)

(56) References Cited

U.S. PATENT DOCUMENTS 7,812,836 B2    10/2010  Koh
8,582,667 B2    11/2013  Kim
(Continued)

FOREIGN PATENT DOCUMENTS

CN    1909635 A    2/2007
CN    101692707 A   4/2010
(Continued)

OTHER PUBLICATIONS

International Search Report dated Oct. 16, 2017 issued by the International Searching Authority in counterpart International Application No. PCT/KR2017/006794 (PCT/ISA/210).
(Continued)

Primary Examiner — Towfiq Elahi
(74) Attorney, Agent, or Firm — Sughrue Mion, PLLC

(57) ABSTRACT

The present invention relates to a sink device and a power control method therefor. The sink device comprises: an HDMI reception unit connected to a source device and receiving a signal transmitted by the source device; and a processor for turning on the power of the sink device when a TMDS clock is received from the source device. Therefore, the power of the sink device is automatically turned on, thereby enabling user convenience to improve.

7 Claims, 6 Drawing Sheets

(51) Int. Cl.
- H04N 21/4363 (2011.01)
- G06F 1/3246 (2019.01)
- G06F 1/3237 (2019.01)
- G06F 1/3215 (2019.01)
- G06F 1/3293 (2019.01)
- G06F 1/12 (2006.01)

(52) U.S. Cl.
CPC .......... G06F 1/3237 (2013.01); G06F 1/3246 (2013.01); G06F 1/3293 (2013.01); G09G 5/008 (2013.01); H04N 21/43635 (2013.01); H04N 21/4436 (2013.01); *G09G 2330/021* (2013.01); *G09G 2370/04* (2013.01); *G09G 2370/12* (2013.01)

(58) Field of Classification Search
CPC ........ G06F 1/12; G06F 1/3215; G06F 1/3237; G06F 1/3246; G06F 1/3293; H04N 21/43635; H04N 21/4436
See application file for complete search history.

(56) References Cited

U.S. PATENT DOCUMENTS

| | | | |
|---|---|---|---|
| 8,862,791 | B2 | 10/2014 | Tao et al. |
| 9,231,720 | B2 | 1/2016 | Ichimura et al. |
| 2007/0152994 | A1* | 7/2007 | Koh .................... H04N 5/63 345/211 |
| 2011/0194628 | A1 | 8/2011 | Kim |
| 2011/0246796 | A1 | 10/2011 | Komori |
| 2013/0009932 | A1 | 1/2013 | Choi et al. |
| 2014/0218616 | A1* | 8/2014 | Toba ................. H04N 21/4302 348/723 |

FOREIGN PATENT DOCUMENTS

| | | |
|---|---|---|
| JP | 5515919 B2 | 6/2014 |
| KR | 10-2007-0006163 A | 1/2007 |
| KR | 10-2007-0028053 A | 3/2007 |
| KR | 10-2008-0054594 A | 6/2008 |
| KR | 10-2011-0092828 A | 8/2011 |
| KR | 10-1111913 B1 | 2/2012 |

OTHER PUBLICATIONS

Written Opinion dated Oct. 16, 2017 issued by the International Searching Authority in counterpart International Application No. PCT/KR2017/006794 (PCT/ISA/237).

Communication dated Jun. 24, 2019, issued by the European Patent Office in counterpart European Application No. 17837156.3.

Communication dated Jul. 28, 2020, issued by the China National Intellectual Property Administration in Chinese Application No. 201780001566.8.

* cited by examiner

SINK DEVICE AND POWER CONTROL METHOD THEREFOR

FIELD OF THE INVENTION

Provided is a sink device and a power control method and, more particularly, to a sink device which receives data from a source device and a power control method therefor.

DESCRIPTION OF THE RELATED ART

With the recent development of electronic technology, many people show interests in high quality contents. Accordingly, products to which high definition multimedia interface (HDMI) is applied have increased.

An electronic apparatus which is recently manufactured is connected to an external device via an HDMI cable, thus capable of outputting a high quality image.

However, n order to provide a high-quality image, a user has to turn on the power of an external device and then, additionally turn on the power of an electronic device, which is inconvenient to a user.

Accordingly, there is a need to seek a method for efficiently controlling power of an electronic device.

SUMMARY

It is an object of the disclosure to provide a sink device and a power supply control method thereof that can turn on its power when a sink device receives a Transition Minimized Differential Signaling (TMDS) clock from a source device.

According to an exemplary embodiment, a sink device includes a high definition multimedia interface (HDMI) reception unit connected to a source device and receiving a signal transmitted by the source device; and a processor for turning on the power of the sink device when a transition minimized differential signaling (TMDS) clock is received from the source device.

The processor may, while the TMDS clock is not received from the source device, when the TMDS clock is received, turn on power of the sink device.

The sink device according to an exemplary embodiment may further include a signal processor; a switch connected to a TMDS clock channel used for reception of the TMDS clock; and a TMDS clock detection unit connected to the switch for detecting the TMDS clock, and the processor may determine whether the TMDS clock is received based on a signal that is output from the TMDS clock detection unit, and based on the TMDS clock being received, control a switching operation of the switch so that the TMDS clock is transmitted to the signal processor.

A power control method of a sink device according to an exemplary embodiment includes receiving a transition minimized differential signaling (TMDS) clock from the source device; and, when the TMDS clock is received from the source device, turning on power of the sink device.

The turning on power may include, while the TMDS clock is not received from the source device, when the TMDS clock is received, turning on power of the sink device.

The sink device may further include a signal processor; a switch connected to a TMDS clock channel used for reception of the TMDS clock; and a TMDS clock detection unit connected to the switch for detecting the TMDS clock, and the method may further include determining whether the TMDS clock is received based on a signal that is output from the TMDS clock.

According to various embodiments of the disclosure as described above, a power source driving status of the source device is determined based on the TMDS clock, and thus, it is possible to more accurately determine the power source driving status of the source device. Accordingly, when the power of the source device is turned on, the power of the sink device is automatically turned on and a user's convenience can be improved.

DETAILED DESCRIPTION OF EXEMPLARY EMBODIMENTS

Figure 1:
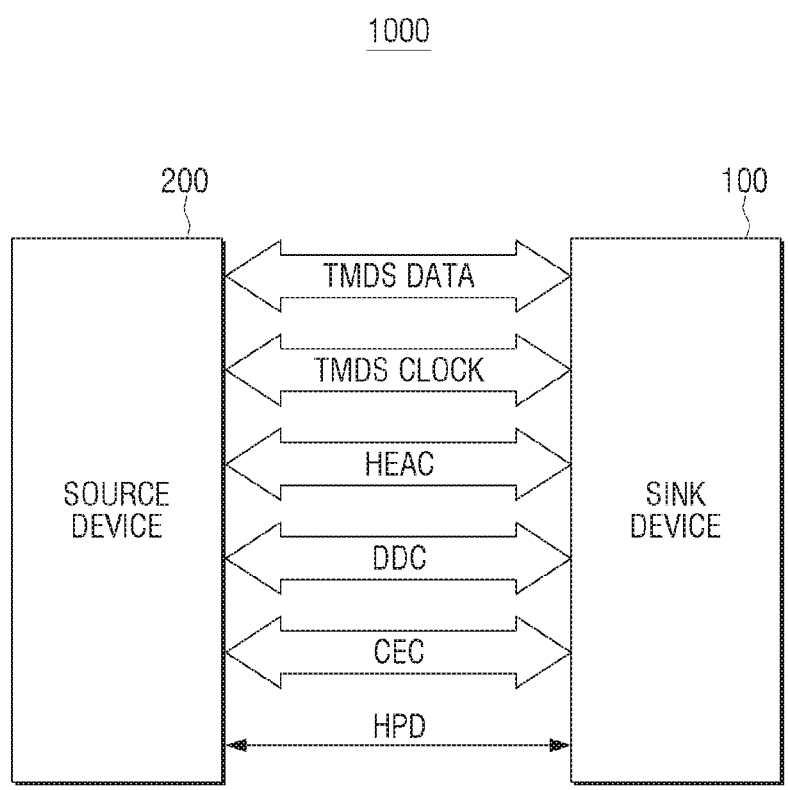
FIG. 1 is a view to illustrate an HDMI system according to an exemplary embodiment.

The terms used in this specification will be briefly described, and the present disclosure will be described in detail.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

The invention is not limited to an embodiment disclosed below and may be implemented in various forms and the scope of the invention is not limited to the following embodiments. In addition, all changes or modifications derived from the meaning and scope of the claims and their equivalents should be construed as being included within the scope of the present disclosure. In the following description, the configuration which is publicly known but irrelevant to the gist of the present disclosure could be omitted.

The terms such as "first," "second," and so on may be used to describe a variety of elements, but the elements should not be limited by these terms. The terms are used simply to distinguish one element from other elements.

The singular expression also includes the plural meaning as long as it does not differently mean in the context. In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In an exemplary embodiment, 'a unit', or 'a part' perform at least one function or operation, and may be realized as hardware, such as a processor or integrated circuit, software that is executed by a processor, or a combination thereof. In addition, a plurality of 'units', or a plurality of 'parts' may be integrated into at least one module or chip and may be realized as at least one processor except for 'units' or 'parts' that should be realized in a specific hardware.

Hereinafter, embodiments of the present disclosure will be described in detail with reference to the accompanying drawings so that those skilled in the art can easily carry out the present invention. However, the present disclosure may be embodied in many different forms and is not limited to the embodiments described herein. In order to clearly illustrate the present disclosure in the drawings, some of the elements that are not essential to the complete understanding of the disclosure are omitted for clarity, and like reference numerals refer to like elements throughout the specification.

FIG. 1 is a view to illustrate an HDMI system according to an exemplary embodiment.

Referring to FIG. 1, the HDMI system 1000 includes a sink device 100 and a source device 200.

The source device 200 may be implemented in various types of electronic devices capable of providing data to the sink device 100, such as a set top box, a DVD player, a Blu-ray disc player, a PC, and a e machine. The sink device 100 may be implemented in various types of electronic devices capable of processing and outputting data received from the source device 200, such as a TV and a PC.

The sink device 100 and the source device 200 is connected via the HDMI cable (not shown) and may communicate using the HDMI method.

Here, the HDMI is composed of communication channels such as TMDS (Transition Minimized Differential Signaling (TMDS), Display Data Channel (DDC) and Consumer Electronics Control (CEC), and may transceive video and audio signals, device information, a control command and so on.

In addition, the HDMI may perform HDMI Ethernet Channel (HEC) function and audio return channel (ARC) function through HDMI Ethernet Audio Return Channel (HEAC), and perform plug and play function through hot plug detection (HPD).

In this case, a method for providing a video signal and an audio signal from the sink device 100 to the source device 200 according to the HDMI method is as described below.

First, the source device 200 may perform a plug-and-play function to recognize the presence of the sink device 100 connected to the source device 200 and read Extended Display Identification Data (EDID) stored in the sink device 100 through the DDC.

The source device 200 may convert the video and audio signals according to the environment of the sink device 100 based on the EDID, and may transmit the video and audio signals to the sink device 100 through the transition minimized differential signaling (TMDS) method.

For example, the source device 200 may encode a video signal and an audio signal in the TMDS format and transmit the TMDS format encoded signal to the sink device 100 through four TMDS channels, that is, three TMDS data channels (for example, TMDS Data 0+, TMDS Data 0−, TMDS Data 1+, TMDS Data 1−, TMDS Data 2−, TMDS Data 2+) and one TMDS clock channel (for example, TMDS CLK−, TMDS CLK+).

In this case, the TMDS data channel is used to transmit the video and audio signals to the sink device 100, and the TMDS clock channel is used to transmit the reference clock (TMDS clock) required for receiving and decoding the video signal by the sink device 100.

Accordingly, the sink device 100 can decode the signals transmitted through the TMDS channel, receive the video and audio signals, and process and output the signals.

According to an embodiment of the disclosure, the sink device 100 determines whether the source device 200 is powered on based on whether a TMDS clock is received from the source device 200, and when the source device 200 is in the power-on state, the power of the sink device 100 can be turned on.

Specifically, the source device 200 transmits the video signal and the audio signal to the sink device 100 through the TMDS data channel in the power-on state, and transmits the TMDS clock through the TMDS clock channel to the sink device 100. In this sense, the sink device 100 may determine that the source device 200 is in the power-on state when the TMDS clock is received from source device 200 through the TMDS clock channel.

Accordingly, the sink device 100 which is in a standby status (that is, power is supplied from outside, but power is not turned on) may determine that, if the TMDS clock is received from the source device 200, the source device 200 is powered on, and turn on the power of the sink device 100 to supply driving power to each component of the sink device 100.

Figure 2:
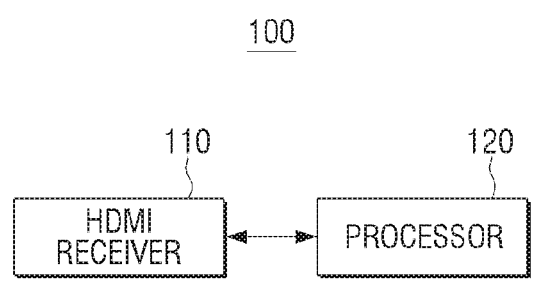
FIG. 2 is a block diagram to describe a configuration of a sink device according to an exemplary embodiment.

FIG. 2 is a block diagram to describe a configuration of a sink device according to an exemplary embodiment.

Referring to FIG. 2, the sink device 100 includes an HDMI receiver 110 and a processor 120.

The HDMI receiver 110 is connected to the source device 200 and receives a signal transmitted from the source device 200.

To be specific, the HDMI receiver 110 may be connected to the HDMI receiver (not shown) of the source device 200 through the HDMI cable (not shown) and receive a signal transmitted from a HDMI transmitter (not shown).

In this case, the HDMI receiver 110 can receive signals transmitted by the HDMI transmitter (not shown) through the various channels described with reference to FIG. 1. In particular, the HDMI receiver 110 may receive the video and audio signals transmitted through the TMDS data channel, and receive the TMDS clock transmitted through the TMDS clock channel.

To do this, the HDMI receiver 110 may include an HDMI port (not shown) to be connected to the HDMI cable (not shown).

The processor 120 controls the overall operation of electronic device 100. For this, the processor 120 may perform operation or data processing related to control of other components included in the electronic device 100, including Micom (or, central processing unit (CPU), random access memory (RAM), and read only memory (ROM).

In particular, the processor 120, when the TMDS clock is received from the source device 200, may turn on the power of the sink device 100.

To be specific, while the power is turned on, the source device 200 may transmit the TMDS clock to the sink device 100.

That is, the source device 200, if the device is in power-on status, may transmit video and audio signals to the sink device 100 through the TMDS method.

In this case, the source device 200 may transmit the video and audio signals to the sink device 100 through the TMDS data channel and transmit the TMDS clock to the sink device 100 through the TMDS clock channel.

Accordingly, when the HDMI receiver 110 receives the TMDS clock, the processor 120 may determine that the source device 200 is powered on, and turn on the power of the sink device 100 to supply power to each component of the sink device 100.

The reason why the processor 120 determines a power driving status of the source device 200 depending on whether the TMDS clock is received is as shown below.

To be specific, the source device 200, when being connected to the sink device 100, may recognize the presence of the sink device 100 through plug-and-play function even before being powered on, and may read EDID information of the sink device 100. In this regard, a power driving status of the source device 200 cannot be determined only with the signal transceived through the DDC and HPD.

However, in order for the source device 200 to transmit the video signal, the audio signal, and the TMDS clock to the sink device 100 through the TMDS channel, the source device 200 must be in the power-on status. Accordingly, when the processor 120 receives the TMDS clock from the source device 200, the processor 120 may determine that the source device 200 is in the power-on status.

However, for some cases, some source devices 200, even before being powered on, may transmit the video signal and the TMDS clock to the sink device 100 through the TMDS channel.

For example the source device 200, when being powered on, may transmit a video for screen saver or a black video to the sink device 100 along with the TMDS clock in order to provide a rapid response speed.

In this case, the processor 120 may not determine that the source device 200 is in the power-on status only by receiving the TMDS clock, and may determine that the source device 200 is in the power-on status when the TMDS clock has not been received from the source device 200 and then the TMDS clock is received.

Accordingly, when the TMDS clock is received from the source device 200 in the state where the TMDS clock is not received from the source device 200, the processor 120 may determine that the source device 200 is in the power-on status and turn on the power of the sink device 100 to be on. That is, the processor 120 may power on the sink device 100 as the TMDS clock is transited.

When the TMDS clock is received from the source device 200, or the TMDS clock has not been received from the source device 200 and then the TMDS clock is received, the processor 120 may power on the sink device 100.

Figure 3:
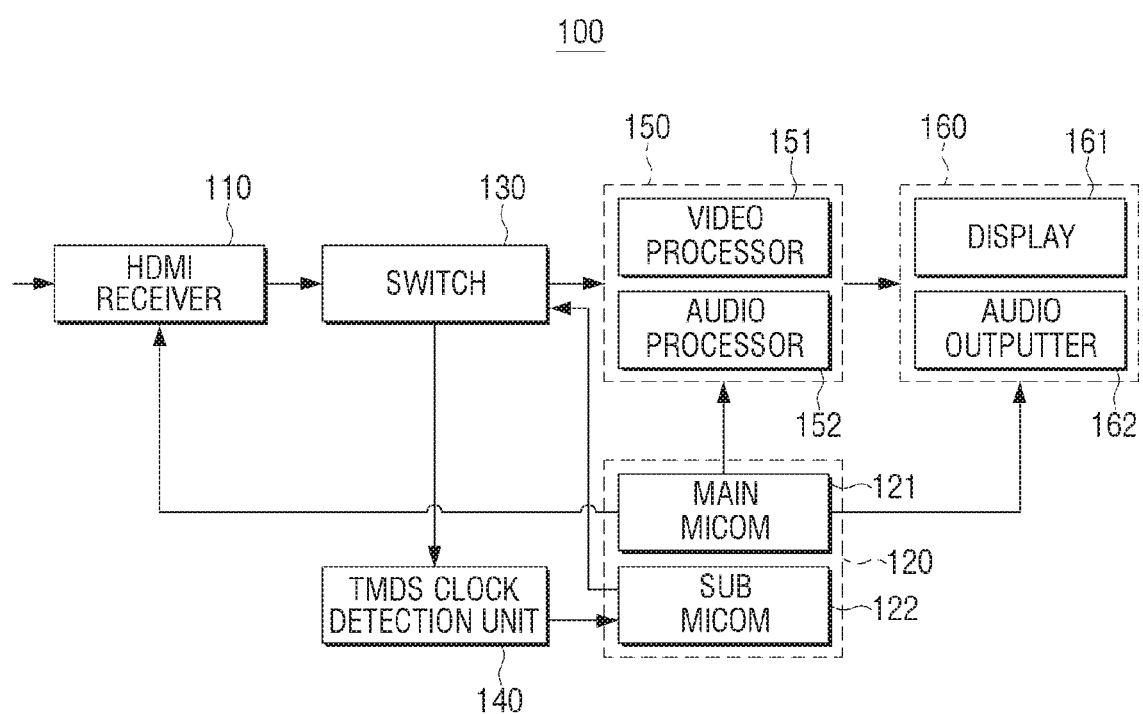
FIGS. 3 and 4 are block diagrams to describe a detailed configuration of a sink device according to an exemplary embodiment.

FIG. 3 is a block diagram to describe a detailed configuration of a sink device according to an exemplary embodiment.

Referring to FIG. 3, the sink device 100 may further include a switch 130, a TMDS clock detection circuit 140, a signal processor 150, and an outputter 160, in addition to the HDMI receiver 110 and the processor 120 as illustrated in FIG. 2.

Figure 4:
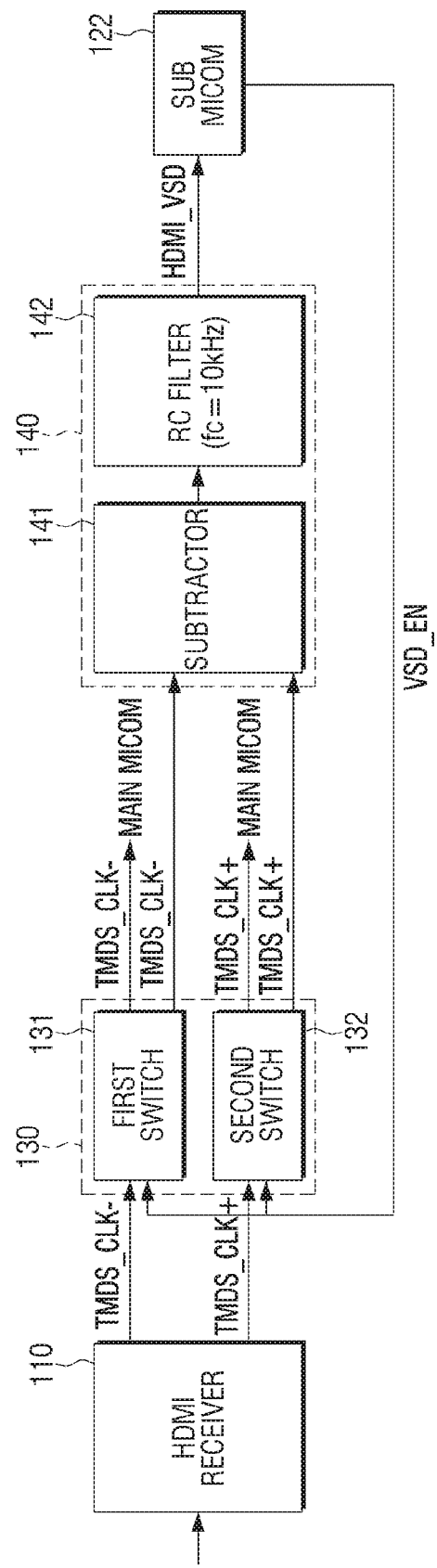

From among the components illustrated in FIG. 3, the components overlapped with the components of FIG. 2 will not be further described. In describing FIG. 3, FIG. 4 will be referred to together in order to further describe each component.

The HDMI receiver 110 may output a signal received from the source device 200 to the signal processor 150.

To be specific, the HDMI receiver 110 may output the video and audio signals received from the source device 200 through the TMDS channel to the signal processor 150.

The switch 130 may be connected to the TMDS clock channel that is used for receiving the TMDS clock.

Specifically, the switch 130 may be connected to the TMDS clock channel used for receiving the TMDS clock, and selectively connect the TMDS clock channel used for receiving the TMDS clock in accordance with the switching operation to the TMDS clock detection unit 140 or the signal processor 150.

In this case, the switch 130 may include a first switch 131 and a second switch 132.

Specifically, an HDMI port (not shown) provided in the HDMI receiver 110 can receive TMDS CLK+ and TMDS CLK− through a specific pin (for example, pin 10 can be allocated for reception of TMDS CLK+, Pin 12 can be allocated for reception of TMDS CLK−). Accordingly, the first and second switches 131 and 132 may be connected to the corresponding pin and can be connected TMDS clock channel used for receiving the TMDS clock.

In this case, the first switch 131 may be connected to the pin used for receiving the TMDS CLK−, and selectively connect the pin used for receiving the TMDS CLK− by the switching operation to the TMDS clock detection unit 140 or the signal processor 150.

Specifically, the first switch 131 is controlled by a sub-microcomputer 122 so that the pin used for receiving the TMDS CLK−, when the sink device 100 is in the power-off status, is connected to the TMDS clock detection unit 140, and then, when the TMDS CLK− is received, a switching operation can be performed so that the pin used for reception of the TMDS CLK− is connected to the signal processor 150.

The second switch 132 may be connected to a pin used for reception of TMDS CLK+, and may connect the pin used for reception of TMDS CLK+ selectively to the TMDS clock detection unit 140 or the signal processor 150 by a switching operation.

Specifically, the second switch 131 is controlled by the sub-microcomputer 122 so that the pin used for receiving the TMDS CLK+, when the sink device 100 is in the power-off status, is connected to the TMDS clock detection unit 140, and then, when the TMDS CLK+ is received, a switching operation can be performed so that the pin used for reception of the TMDS CLK+ is connected to the signal processor 150.

The TMDS clock detection unit 140 may be connected to the switch 130 and detect the TMDS clock.

To do this, the TMDS clock detection unit 140 may include a subtractor 141 and an RC filter 142.

Specifically, the subtractor 141 may subtract the signal output the first switch 131 from the signal output from the second switch 132, and the RC filter 142 may remove noise of the signal output from the subtractor 141 and output the same through filtering.

Accordingly, when TMDS CLK− and TMDS CLK+ are received from the source device 200, the TMDS clock detection unit 140 may output a signal having a constant level.

The processor 120 may determine whether the TMDS clock is received based on a signal which is output from the TMDS clock detection unit 140 and when the TMDS clock is received, the processor may control a switching operation of the switch 130 so that the TMDS clock is transferred to the signal processor 150.

Specifically, when the sink device 100 is in the standby state, driving power is applied to the sub-microcomputer 122, and the sub-microcomputer 122 may receive a signal output from the TMDS clock detection unit 140, determine whether or not the corresponding signal corresponds to a preset level, and determine whether the TMDS clock is received.

That is, when TMDS CLK− and TMDS CLK+ are received from the source device 200, the TMDS clock detection unit 140 can output a signal having a constant level. Accordingly, the sub-microcomputer 122 may determine that the TMDS clock is received from the source device 200 when the output from the TMDS clock detection unit 140 corresponds to a predetermined level.

Accordingly, when it is determined that the TMDS clock is received from the source device 200, the sub-microcomputer 122 may turn on the power of the sink device 100 and control so that driving power is applied to each component of the sink device 100. In the meantime, an operation of the sink device 100, after the power is on, for example, an operation to output a video and an audio can be controlled by a main microcomputer 123.

The sub-microcomputer 122 may control a switching operation of the first switch 131 and the second switch 132 and control the TMDS CLK− and TMDS CLK+ which are received from the source device 200 to the signal processor 150.

Thereafter, when the sink device 100 is powered off, the sub-microcomputer 122 may control that the first switch 131 and the second switch 132 are connected to the TMDS clock detection unit 140.

The signal processor 150 may perform signal processing regarding a signal received from the source device 200.

To be specific, the signal processor 150 may have a TMDS decoder (not shown) and perform TMDS decoding of a signal received through the TMDS channel.

That is, the HDMI transmitter (not shown), in order to convert a video signal and an audio signal to a format transmittable from the HDMI, may perform TMDS encoding of signals using the TMDS encoder (not shown) and transmit the video signal, audio signal encoded with TMDS format, and TMDS clock to the sink device 100 through the TMDS channel.

Accordingly, the signal processor 150 may have the TMDS decoder (not shown), perform TMDS decoding of the signals received from the source device 200 through the TMDS channel, and receive a video signal, an audio signal, and TMDS clock.

In this case, the video processor 151 may perform signal processing of a video signal in a format which can be output from a display 151, and an audio processor 152 may perform signal processing of an audio signal in a format which can be output from a speaker 162. In this case, at least one of the video processor 151 and the audio processor 152 can use TMDS clock for signal processing.

A display 161 may display a video which is output from the signal processor 150 and the speaker 160 may output an audio which is output from the signal processor 150.

In this case, the display 161 may be implemented as liquid crystal display (LCD), organic light emitting diodes (OLED) display and so on, and the audio outputter 162 may be implemented as a speaker (not shown) or an external output terminal (not shown), and the like.

In the aforementioned example, it has been described that TMDS CLK− is subtracted from the TMDS CLK+ to detect the TMDS clock, but this is merely exemplary. That is, the TMDS clock detection unit 140 may detect TMDS clock using various methods such as using OP Amp.

In the afore-mentioned example, it has been described that the TMDS decoding is performed by the signal processor 150, but this is merely exemplary. That is, the HDMI receiver 110 may perform TMDS decoding of signals received from the source device 200 through the TMDS channel and provide the signals to the signal processor 150.

Figure 5:
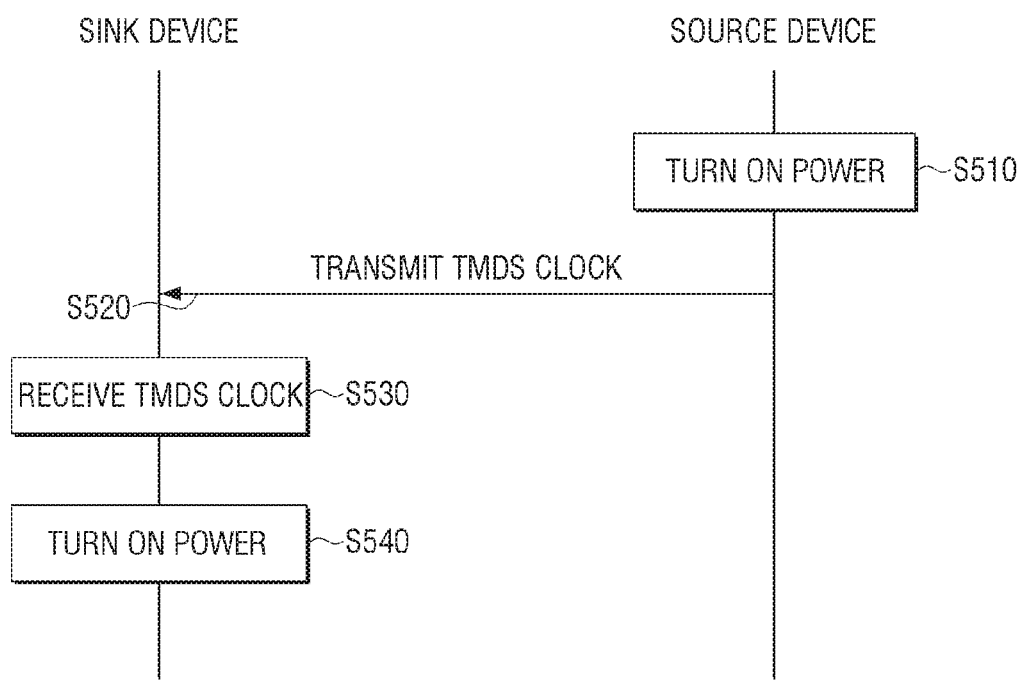
FIG. 5 is a sequence map to briefly describe a power control method according to an exemplary embodiment.

FIG. 5 is a sequence map to briefly describe a power control method according to an exemplary embodiment.

First of all, the source device 200 is powered on in step S510.

Then, the TMDS clock may be transmitted to the sink device in step S520, and the sink device 100 may receive the TMDS clock from the source device 200 in step S530.

Accordingly, the sink device 100 may determine that the source device 200 is in a power-on status and may turn on its power in step S540.

Figure 6:
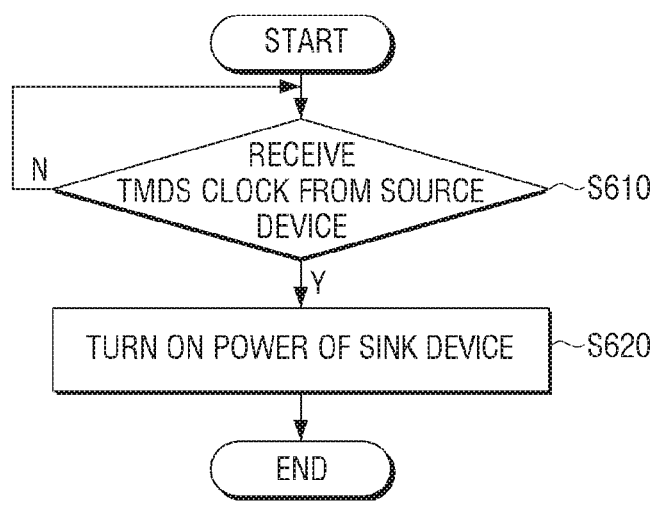
FIG. 6 is a flowchart to describe a power control method of a sink device according to an exemplary embodiment.

FIG. 6 is a flowchart to describe a power control method of a sink device according to an exemplary embodiment.

A TMDS clock is received from the source device in step S610.

Accordingly, when the TMDS clock is received from the source device, the power of the sink device is turned on in step S620.

Here, the source device, when the power of the source device is turned on, may transmit the TMDS clock to the sink device.

In the meantime, in S620, while the TMDS clock is not received from the source device, when the TMDS clock is received, the power of the sink device can be turned on.

The sink device may further include a signal processor, a switch connected to the TMDS clock channel which is used for receiving the TMDS clock, and a TMDS clock detection unit which is connected to the switch to detect the TMDS clock. In this case, it can be determined that the TMDS clock is received based on a signal which is output from the TMDS clock detection unit, and if the TMDS clock is received, a switching operation of a switch can be controlled so that the TMDS clock is transferred to the TMDS clock.

The method of controlling power of a sink device by detecting whether the sink device receives TMDS clock from the source device has been described above.

A non-transitory computer program storing a program that sequentially performs a power control method of the electronic device according to the disclosure can be provided.

Non-transitory computer readable medium means a medium that stores data for a short period of time such as a register, a cache, a memory, etc., but semi-permanently stores data and can be read by a device. Specific examples of non-transitory computer readable media include compact disc (CD), digital versatile disc (DVD), hard disk, Blu-ray disk, USB, memory card, ROM, etc.

In a block diagram illustrating the electronic device does not include a bus, but communication between each component of an electronic device can be done through the bus. In addition, an electronic device may further include CPU performing the aforementioned various steps and a processor such as a micro-processor.

Although exemplary embodiments have been shown and described, it will be appreciated by those skilled in the art that changes may be made to these exemplary embodiments without departing from the principles and spirit of the present disclosure. Accordingly, the scope of the present disclosure is not construed as being limited to the described exemplary embodiments, but is defined by the appended claims as well as equivalents thereto.

What is claimed is:
1. A sink device comprising:
   a high definition multimedia interface (HDMI) reception unit connected to a source device and receiving a signal transmitted by the source device;
   a signal processor;

a transition minimized differential signaling (TMDS) clock detection unit configured to detect a TMDS clock;

a switch selectively connected to at least one of the signal processor and the TMDS clock detection unit; and a processor configured to:

control the switch to connect with the TMDS clock detection unit in a standby mode, and based on the TMDS clock being detected by the TMDS clock detection unit, control the switch to connect with the signal processor for transmitting the signal to the signal processor and supply power to the signal processor for processing the signal received from the source device, wherein the switch comprises:

a first switch configured to receive a TMDS CLK (−) signal from the HDMI reception unit, and a second switch configured to receive a TMDS CLK (+) signal from the HDMI reception unit.

2. The sink device of claim 1, wherein the processor is configured to:

while the sink device is in the standby mode, based on the TMDS clock being received, turn on the power of the sink device.

3. The sink device of claim 1, wherein the processor is further configured to determine whether the TMDS clock is received based on a signal that is output from the TMDS clock detection unit, and based on the TMDS clock being received, control a switching operation of the switch so that the TMDS clock is transmitted to the signal processor.

4. A power control method of a sink device, the power control method comprising:

controlling a switch of the sink device to connect with a transition minimized differential signaling (TMDS) clock detection unit of the sink device in a standby mode; and based on a TMDS clock being detected by the TMDS clock detection unit, controlling the switch to connect with a signal processor of the sink device for transmitting a signal received from a source device through a high definition multimedia interface (HDMI) reception unit and supplying power to the signal processor for processing the signal received from the source device based on the TMDS clock being received from the source device, wherein the switch comprises:

a first switch configured to receive a TMDS CLK (−) signal from the HDMI reception unit; and a second switch configured to receive a TMDS CLK (+) signal from the HDMI reception unit.

5. The power control method of claim 4, wherein the supplying comprises, while the sink device is in the standby mode, based on the TMDS clock being received, supplying the power of the sink device.

6. The power control method of claim 4, further comprising determining whether the TMDS clock is received based on a signal that is output from the TMDS clock detection unit, and based on the TMDS clock being received, controlling a switching operation of the switch so that the TMDS clock is transmitted to the signal processor.

7. The sink device of claim 1, wherein the TMDS clock detection unit further comprises:

a subtractor configured to subtract a first signal output from the first switch from a second signal output from the second switch; and an RC filter configured to remove noise from a third signal output from the subtractor.

* * * * *